(12) United States Patent
Streng et al.

(10) Patent No.: US 7,685,903 B2
(45) Date of Patent: Mar. 30, 2010

(54) DUAL ON-CENTER COLUMN LOCK MECHANISM

(75) Inventors: Joseph R. Streng, Freeland, MI (US); Aaron T. Gilbert, Frankenmuth, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/123,097

(22) Filed: May 19, 2008

(65) Prior Publication Data

US 2009/0282945 A1  Nov. 19, 2009

(51) Int. Cl.
*B62D 1/18* (2006.01)
(52) U.S. Cl. .......................................... 74/493; 74/492
(58) Field of Classification Search ............. 74/492, 74/493; 280/775
See application file for complete search history.

(56) References Cited

U.S. PATENT DOCUMENTS

| | | | |
|---|---|---|---|
| 5,915,726 A | 6/1999 | Hibino et al. | |
| 6,419,269 B1 * | 7/2002 | Manwaring et al. | 280/775 |
| 6,616,185 B2 | 9/2003 | Manwaring et al. | |
| 6,695,349 B2 * | 2/2004 | Bohlen et al. | 280/775 |
| 7,097,205 B2 | 8/2006 | Camp et al. | |
| 2003/0057694 A1 | 3/2003 | Manwaring et al. | |
| 2006/0021460 A1 | 2/2006 | Schulz | |
| 2006/0207379 A1 | 9/2006 | Riefe et al. | |

* cited by examiner

*Primary Examiner*—Richard W L Ridley
*Assistant Examiner*—Terence Boes
(74) *Attorney, Agent, or Firm*—Cantor Colburn LLP

(57) ABSTRACT

An adjustable steering column assembly includes a column jacket extending along a longitudinal axis. The column jacket includes a compression bracket mounted thereto, and is supported by a mounting bracket. A pawl engages a telescope slot defined by the compression bracket in interlocking engagement to mechanically lock the longitudinal position of the column jacket relative to the mounting bracket. A transverse cam mechanism moves the pawl generally vertically into and out of engagement with the telescope slot. An axial cam mechanism compresses the compression bracket against the mounting bracket. The transverse cam mechanism and the axial cam mechanism are operated by shaft extending along a shaft axis intersecting the column jacket. The transverse cam mechanism and the axial cam mechanism each include first and second cam mechanism disposed on opposing sides of the column jacket and simultaneously operable by a lever.

23 Claims, 6 Drawing Sheets

DUAL ON-CENTER COLUMN LOCK MECHANISM

BACKGROUND OF THE INVENTION

1. Field of the Invention

The subject invention generally relates to a steering column assembly for a vehicle. More specifically, the subject invention relates to an adjustable steering column assembly adjustable in at least one of a longitudinal direction along a longitudinal axis and a pivotable direction transverse to the longitudinal axis.

2. Description of the Prior Art

Adjustable steering column assemblies include a locking mechanism to secure the position of a column jacket relative to a mounting bracket. The locking mechanism often employs a friction/compression locking device that applies a compressive force to compress the mounting bracket against the column jacket to hold the column jacket in place. The locking mechanism may additionally employ a positive locking device, such as interlocking teeth between members. The positive locking device holds the position of the column jacket relative to the mounting bracket in place during collapse of the steering column assembly during an impact event, such as during a vehicular collision.

Typically, the locking mechanism includes a bolt or shaft extending across the column jacket, transverse to the longitudinal axis, to operate the friction locking device and/or the positive locking device. The bolt or shaft is disposed above or below the column jacket. However, this configuration of the bolt and the various locking devices arranged above or below the column jacket require a significant amount of space.

U.S. Pat. No. 7,097,205 discloses a steering column assembly having a locking mechanism disposed along an axis that intersects the column jacket. However, the locking mechanism is not capable of applying a compressive force or actuating other locking devices on both sides of the column jacket, i.e., the locking mechanism is configured to only operate on one side of the column jacket.

SUMMARY OF THE INVENTION AND ADVANTAGES

The subject invention provides a steering column assembly for a vehicle. The steering column assembly comprises a mounting bracket. The mounting bracket is configured for attachment to the vehicle. A column jacket is coupled to the mounting bracket. The column jacket is longitudinally moveable along a longitudinal axis relative to the mounting bracket. A compression bracket is mounted to the column jacket. The compression bracket defines a telescope slot having a plurality of telescope slot teeth extending along the longitudinal axis. A shaft is coupled to the column jacket. The shaft extends along a shaft axis. The shaft axis intersects the column jacket and is transverse to the longitudinal axis. The shaft is rotatable between a lock position and a release position. A pawl is coupled to the shaft for engagement with the telescope slot teeth. A transverse cam mechanism is coupled to the shaft. The transverse cam mechanism moves the pawl transverse to the shaft axis into interlocking engagement with the telescope slot teeth in response to rotation of the shaft into the lock position to prevent the longitudinal movement of the column jacket. The transverse cam mechanism moves the pawl transverse to the shaft axis out of interlocking engagement with the telescope slot teeth in response to rotation of the shaft into the release position to permit the longitudinal movement of the column jacket.

Accordingly, the subject invention provides a compact adjustable steering column assembly in which a mechanical interlocking interface, e.g., between the pawl and the telescope lock teeth, is disposed along the shaft axis which intersects the column jacket. In other words, the shaft is not disposed above or below the column jacket, thereby reducing the space requirement of the steering column assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle, and is telescopically adjustable in a longitudinal direction along a longitudinal axis 22 and pivotably adjustable in a tilt direction transverse to the longitudinal axis 22. The steering column assembly 20 rotatably supports a steering wheel (not shown) as is well known.

Figure 1:
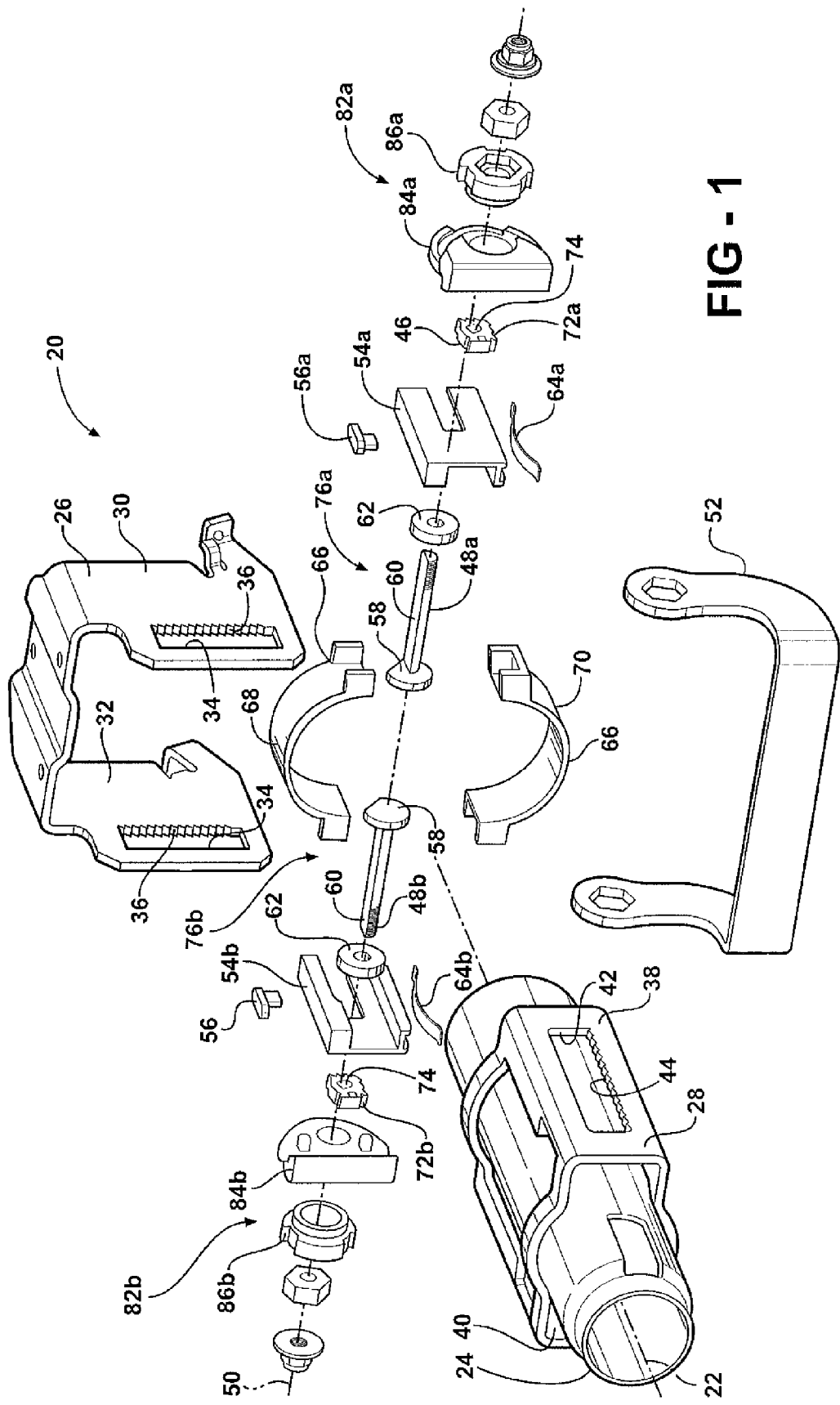
FIG. 1 is an exploded perspective view of a steering column assembly.
Figure 2:
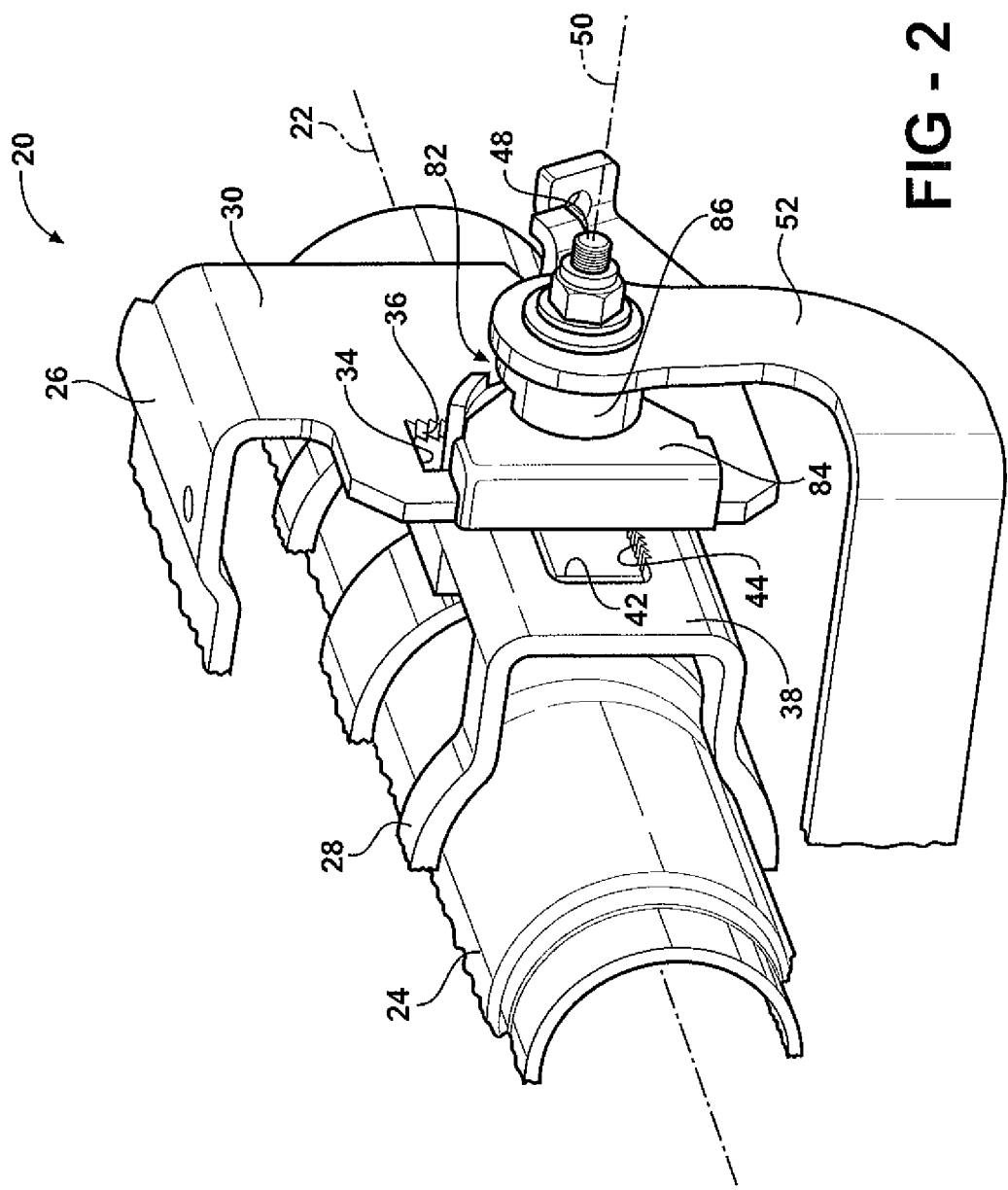
FIG. 2 is partial perspective view of the steering column assembly in a lock position.
Figure 3:
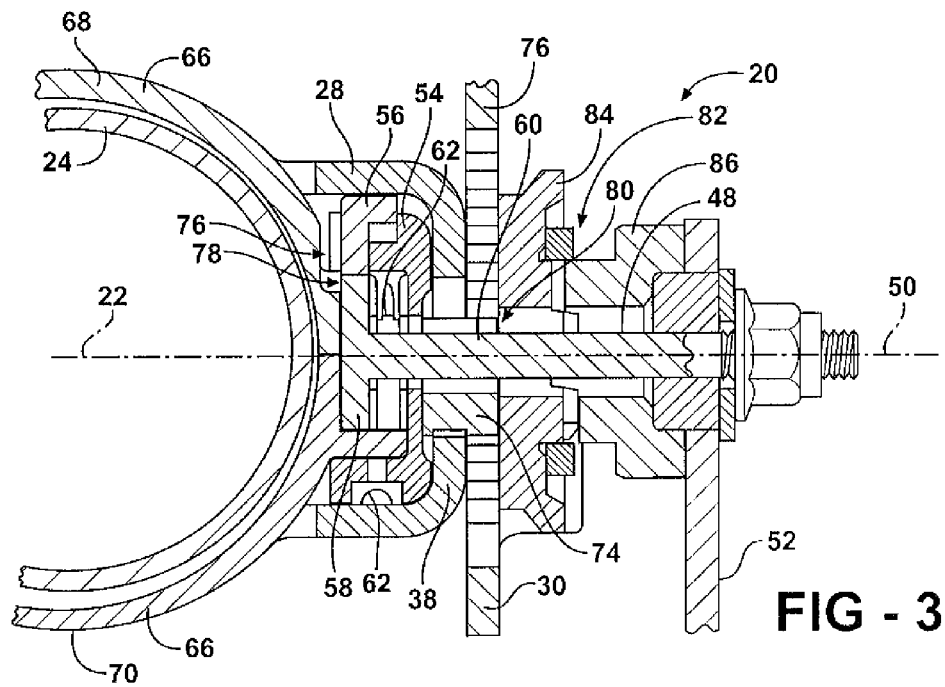
FIG. 3 is a partial cross sectional view of the steering column assembly in the lock position.

Referring to FIGS. 1 and 2, the steering column assembly 20 comprises a column jacket 24. The column jacket 24 extends along the longitudinal axis 22. Preferably, the column jacket 24 includes a lower column jacket (not shown) and an upper column jacket. The upper column jacket is telescopically moveable along the longitudinal axis 22 relative to the lower column jacket to adjust a longitudinal position of the steering wheel. Preferably, the column jacket 24 includes a circular cross section. However, it should be appreciated that the column jacket 24 may include some other cross sectional shape.

The column jacket 24 is coupled to a mounting bracket 26. The column jacket 24 is longitudinally moveable along the longitudinal axis 22 relative to the mounting bracket 26. The mounting bracket 26 is configured for attachment to the vehicle. It should be appreciated that the mounting bracket 26 may be configured in any suitable manner, and may include a single bracket or multiple brackets cooperating together to mount the column jacket 24 to the vehicle. Preferably, the mounting bracket 26 defines a tilt axis about which the column jacket 24 pivots to adjust a vertical position of the steering wheel as is well known.

The steering column assembly 20 is symmetrical along a vertical plane extending through the longitudinal axis 22.

Accordingly, the steering column assembly 20 includes a first half and a second half, which are mirror images of each other. As such, the mounting bracket 26 includes a first plate 30 and a second plate 32. The first plate 30 is disposed adjacent the column jacket 24 in a generally vertical position, along one side of the column jacket 24. The second plate 32 is generally parallel to the first plate 30 in a generally vertical position, and is disposed opposite the column jacket 24 relative to the first plate 30, on an opposing side of the column jacket 24 and adjacent thereto.

The mounting bracket 26 defines a rake slot 34. As shown, the first plate 30 defines a first rake slot 34A and the second plate 32 defines a second rake slot 34B. Both the first rake slot 34A and the second rake slot 34B include a plurality of rake slot teeth 36. The first rake slot 34A and the second rake slot 34B, along with the rake slot teeth 36 defined by the first rake slot 34A and the second rake slot 34B, extend generally vertically and transverse to the longitudinal axis 22.

A compression bracket 28 is mounted to the column jacket 24. The compression bracket 28 includes a first wall 38 and a second wall 40 spaced from the column jacket 24 and disposed adjacent the first plate 30 and the second plate 32 of the mounting bracket 26 respectively. Accordingly, the first wall 38 and the second wall 40 are disposed on opposing sides of the column jacket 24.

The compression bracket 28 defines a telescope slot 42. As shown, the first wall 38 defines a first telescope slot 42A adjacent the first rake slot 34A and the second wall 40 defines a second telescope slot 42B adjacent the second rake slot 34B. Both the first telescope slot 42A and the second telescope slot 42B include a plurality of telescope slot teeth 44. The first telescope slot 42A and the second telescope slot 42B, along with the telescope slot teeth 44 defined by the first telescope slot 42A and the second telescope slot 42B, extend along the longitudinal axis 22 generally parallel to the column jacket 24. The first telescope slot 42A and the second telescope slot 42B are disposed facing opposing sides of the column jacket 24, and are not spaced above or below the column jacket 24.

A shaft 48 is coupled to the column jacket 24. The shaft 48 extends along a shaft axis 50. The shaft axis 50 intersects the column jacket 24, and is transverse to the longitudinal axis 22. In other words, the shaft 48 is disposed at and extends from a general vertical midsection of the column jacket 24, and does not extend across the column jacket 24, either above or below the column jacket 24. The shaft 48 is rotatable about the shaft axis 50 between a lock position and a release position. As shown, the shaft 48 includes a first shaft 48A extending through the first telescope slot 42A and the first rake slot 34A and a second shaft 48B extending through the second telescope slot 42B and the second rake slot 34B. Each of the first shaft 48A and the second shaft 48B extends along the shaft axis 50. Accordingly, the first shaft 48A and the second shaft 48B are disposed on opposing sides of the column jacket 24.

A lever 52 is mounted to the shaft 48. The lever 52 rotates the shaft 48 between the lock position and the release position. As shown, the lever 52 is attached to the first shaft 48A and the second shaft 48B, and simultaneously rotates the first shaft 48A and the second shaft 48B between the lock position and the release position.

A slider body 54 is disposed between the column jacket 24 and the compression bracket 28. The slider body 54 includes a cross section perpendicular to the longitudinal axis 22 defining a C-shaped channel facing the column jacket 24. A block 56 is coupled to and supported by the slider body 54. A top leg of the generally C-shaped cross section of the slider body 54 is in vertical sliding engagement with the block 56. The block 56 includes a top surface abutting the compression bracket 28.

The slider body 54 is moveable relative to the block 56 in a generally vertical direction transverse to the shaft axis 50. Accordingly, the slider body 54 is also moveable relative to the compression bracket 28 in a generally vertical direction transverse to the shaft axis 50. Therefore, it should be appreciated that the block 56 is stationary relative to the compression bracket 28, with the block 56 guiding vertical movement of the slider body 54. As the first half and the second half of the steering column assembly 20 are mirror images, it should be appreciated that the slider body 54 includes a first slider body 54A and a second slider body 54B disposed on opposite sides of the column jacket 24, adjacent the first wall 38 and the second wall 40 of the compression bracket 28 respectively.

The first shaft 48A and the second shaft 48B are mirror images of each other, and each includes a head portion 58 and a shank portion 60. The head portion 58 is disposed within the C-shaped channel of the slider body 54, with the shank portion 60 extending outward away from the column jacket 24 through the slider body 54, the telescope slot 42 and the rake slot 34.

A thrust washer 62 is disposed between the head portion 58 and the slider body 54. As the first half and the second half of the steering column assembly 20 are mirror images, it should be appreciated that the head portion 58 of the first shaft 48A is disposed within the C-shaped channel of the first slider body 54A, with a thrust washer 62 therebetween. Likewise, the head portion 58 of the second shaft 48B is disposed within the C-shaped channel of the second slider body 54B with a thrust washer 62 therebetween.

A spring 64 is disposed between the slider body 54 and the compression bracket 28 to bias the slider body 54 in the generally vertical direction transverse to the shaft axis 50. As the first half and the second half of the steering column assembly 20 are mirror images, it should be appreciated that the spring 64 includes a first spring 64A engaging the first slider body 54A and a second spring 64B engaging a second slider body 54B. Preferably, the spring 64 includes a bar spring 64. However, it should be appreciated that the spring 64 may include some other device capable of biasing the slider body 54 upward.

A retainer 66 is in sliding engagement with the column jacket 24. The retainer 66 rotatably supports the head portion 58 of the first shaft 48A and the head portion 58 of the second shaft 48B. As shown, the retainer 66 includes an upper half 68 and a lower half 70 extending around and encircling the column jacket 24, and sandwiching the head portion 58 of the first shaft 48A and the head portion 58 of the second shaft 48B therebetween. The column jacket 24 is moveable relative to the retainer 66 along the longitudinal axis 22 as the column jacket 24 is adjusted along the longitudinal axis 22.

A pawl 72 is coupled to the shaft 48 for engagement with the telescope slot teeth 44. The pawl 72 defines an aperture 74 with the shaft 48 extending through the aperture 74. As shown, a first pawl 72A is coupled to the first shaft 48A and a second pawl 72B is coupled to the second shaft 48B. The first pawl 72A engages the telescope slot teeth 44 defined by the first telescope slot 42A and the second pawl 72B engages the telescope slot teeth 44 defined by the second telescope slot 42B.

The first pawl 72A and the second pawl 72B each include a plurality of rake teeth 46. The rake teeth 46 engage the rake slot teeth 36 in response to a collision event. As such, during normal operation, the rake teeth 46 defined by the first pawl 72A and the second pawl 72B are disengaged from the rake slot teeth 36 defined by the first rake slot 34A and the second rake slot 34B.

Referring also to FIGS. 3 through 7, a transverse cam mechanism 76 is coupled to the shaft 48. The transverse cam mechanism 76 moves the pawl 72 transverse to the shaft axis 50 into interlocking engagement with the telescope slot teeth 44 in response to rotation of the shaft 48 into the lock position. The interlocking engagement between the pawl 72 and the telescope slot teeth 44 prevent the longitudinal movement of the column jacket 24. The transverse cam mechanism 76 moves the pawl 72 out of interlocking engagement with the telescope slot teeth 44 in response to rotation of the shaft 48 into the release position. Disengagement of the pawl 72 from the telescope slot teeth 44 permits the longitudinal movement of the column jacket 24.

It should be appreciated that as the first half and the second half of the steering column assembly 20 are mirror images of each other, each includes a transverse cam mechanism 76. Therefore, the transverse cam mechanism 76 includes a first transverse cam mechanism 76A coupled to the first shaft 48A and a second transverse cam mechanism 76B coupled to the second shaft 48B. The first transverse cam mechanism 76A and the second transverse cam mechanism 76B are disposed on opposing sides of the column jacket 24. It should be appreciated that the first transverse cam mechanism 76A and the second transverse cam mechanism 76B operate in the same manner on opposing sides of the column jacket 24. The lever 52 is attached to the first shaft 48A and the second shaft 48B to simultaneously operate the first transverse cam mechanism 76A and the second transverse cam mechanism 76B.

The transverse cam mechanism 76 includes a first transverse cam interface 78 for moving the shaft 48 and the pawl 72 relative to the longitudinal axis 22, and a second transverse cam interface 80 for moving the pawl 72 relative to the shaft axis 50.

Figure 5:
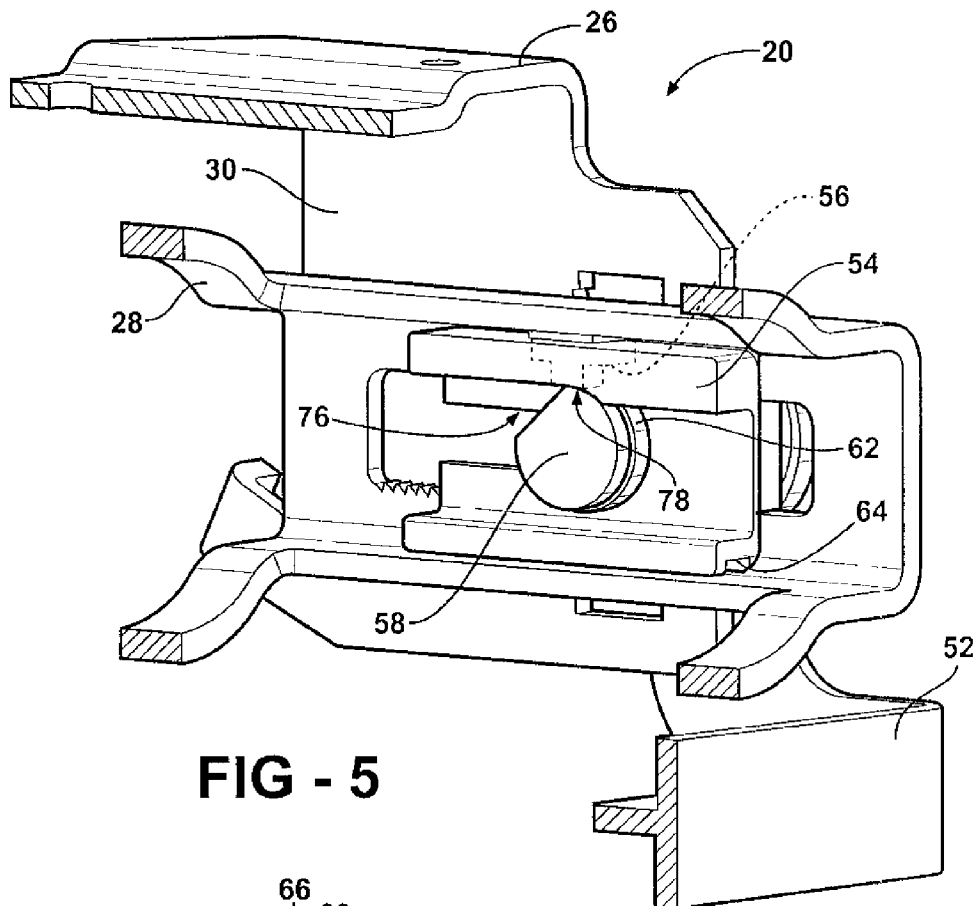
FIG. 5 is a partial perspective view of the steering column assembly in the lock position.
Figure 7:
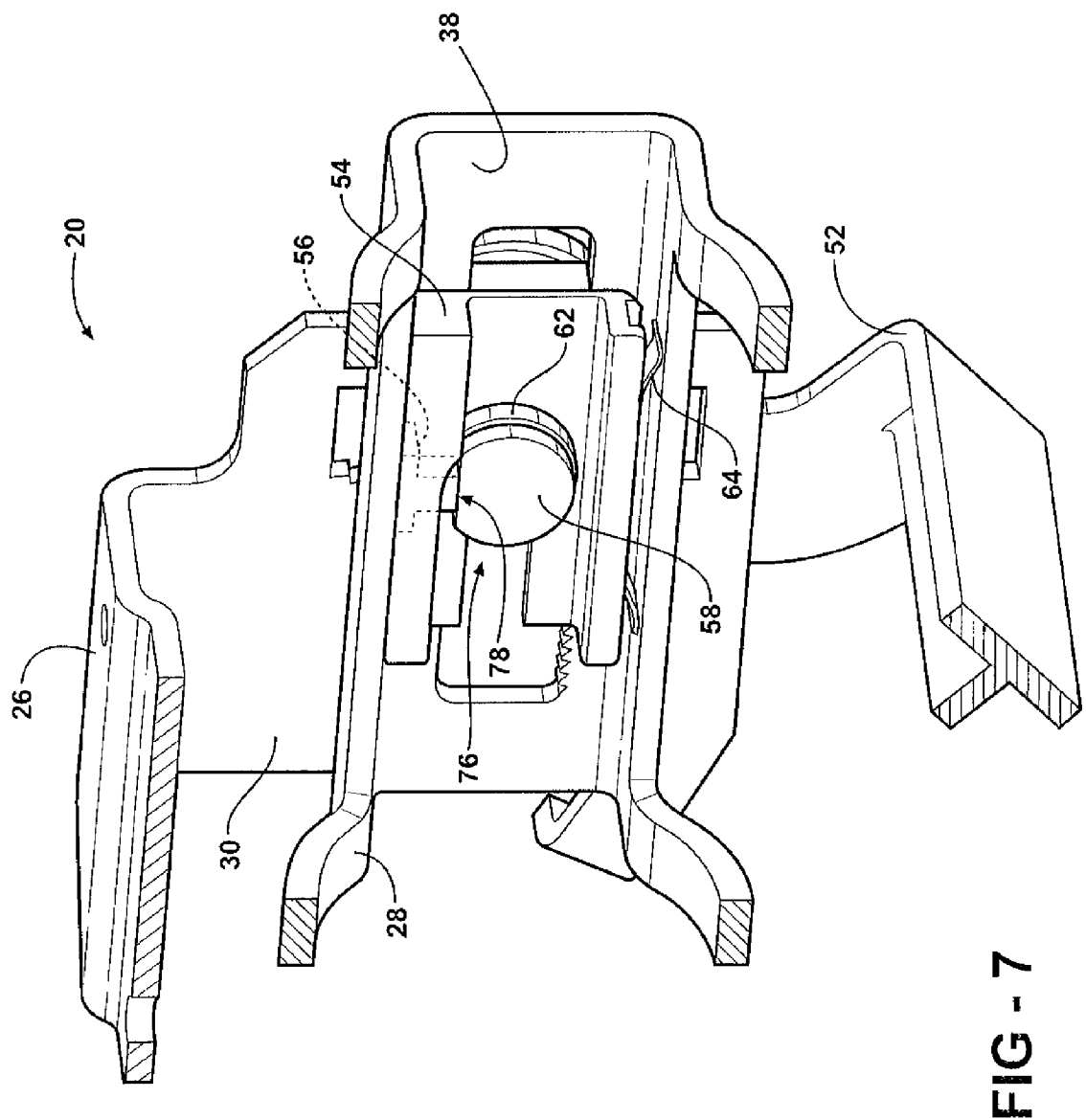
FIG. 7 is a partial perspective view of the steering column assembly in the release position.

As best shown in FIGS. 5 and 7, the first transverse cam interface 78 includes the head portion 58 mounted onto the shaft 48. The head portion 58 defines a cam profile. As shown, the cam profile of the head portion 58 includes a D-shaped cross section perpendicular to the shaft axis 50. However, it should be appreciated that the cam profile may include some other cross sectional shape perpendicular to the shaft axis 50. The first transverse cam interface 78 further includes the block 56 being disposed between the head portion 58 and the compression bracket 28. The block 56 engages the cam profile of the head portion 58.

Figure 4:
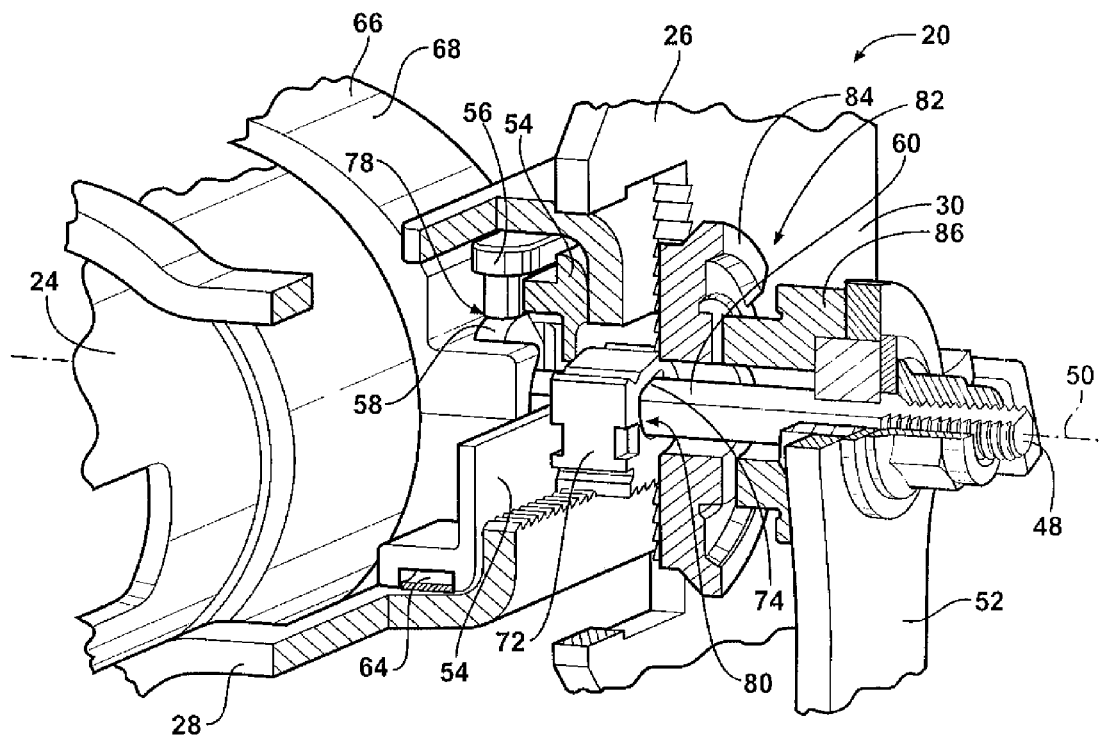
FIG. 4 is a partial cut-away perspective view of the steering column assembly in the lock position.
Figure 6:
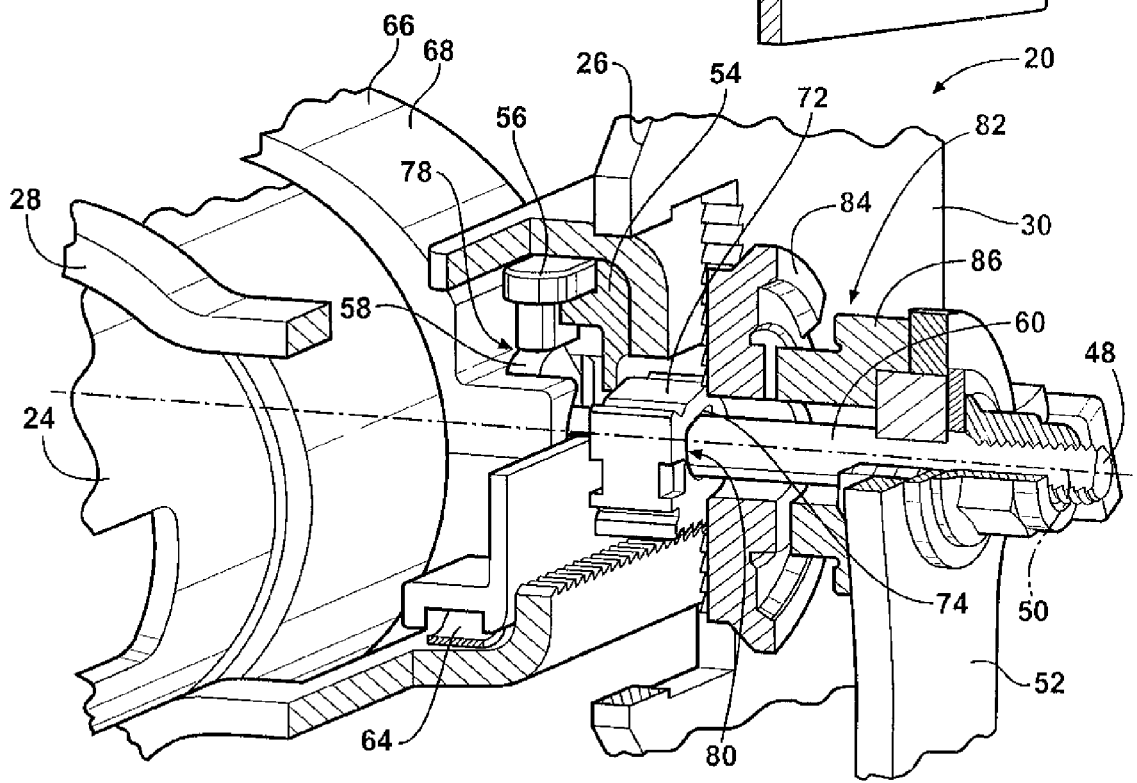
FIG. 6 is a partial cut-away perspective view of the steering column assembly in a release position.

Referring to FIGS. 4 through 7, in operation, the first transverse cam interface 78 moves both the shaft 48 and the pawl 72 relative to the longitudinal axis 22. In response to rotation of the shaft 48 by the lever 52, the cam profile of the head portion 58 rotates about the shaft axis 50 relative to the block 56. The spring 64 continuously biases the slider body 54 and thereby the shaft 48 upward. The block 56 rides on the cam profile of the head portion 58 as the head portion 58 rotates about the shaft axis 50, thereby permitting relative movement of the slider body 54 in response to the biasing force of the spring 64. Accordingly, when the shaft 48 is rotated into the release position, the slider body 54, the shaft 48 and the pawl 72 are moved in a generally upward vertically direction relative to the compression bracket 28, thereby moving the pawl 72 out of interlocking engagement with the telescope slot teeth 44, as shown in FIGS. 6 and 7. Similarly, when the shaft 48 is rotated into the lock position, the slider body 54, the shaft 48 and the pawl 72 are moved in a generally downward vertical direction relative to the compression bracket 28, thereby moving the pawl 72 into interlocking engagement with the telescope slot teeth 44, as shown in FIGS. 4 and 5. It should be appreciated that the first transverse cam interface 78 of both the first transverse cam mechanism 76A and the second transverse cam mechanism 76B operate in the same manner on opposing halves of the steering column assembly 20.

Figure 8:
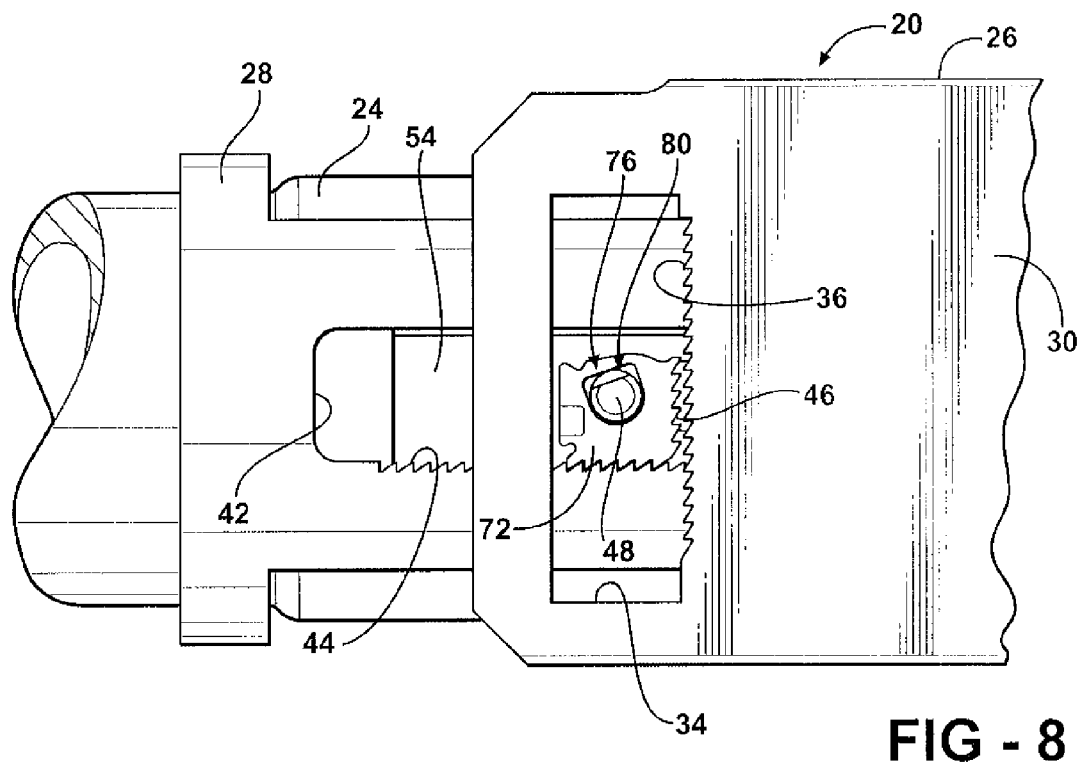
FIG. 8 is a partial side plan view of the steering column assembly in the lock position.
Figure 9:
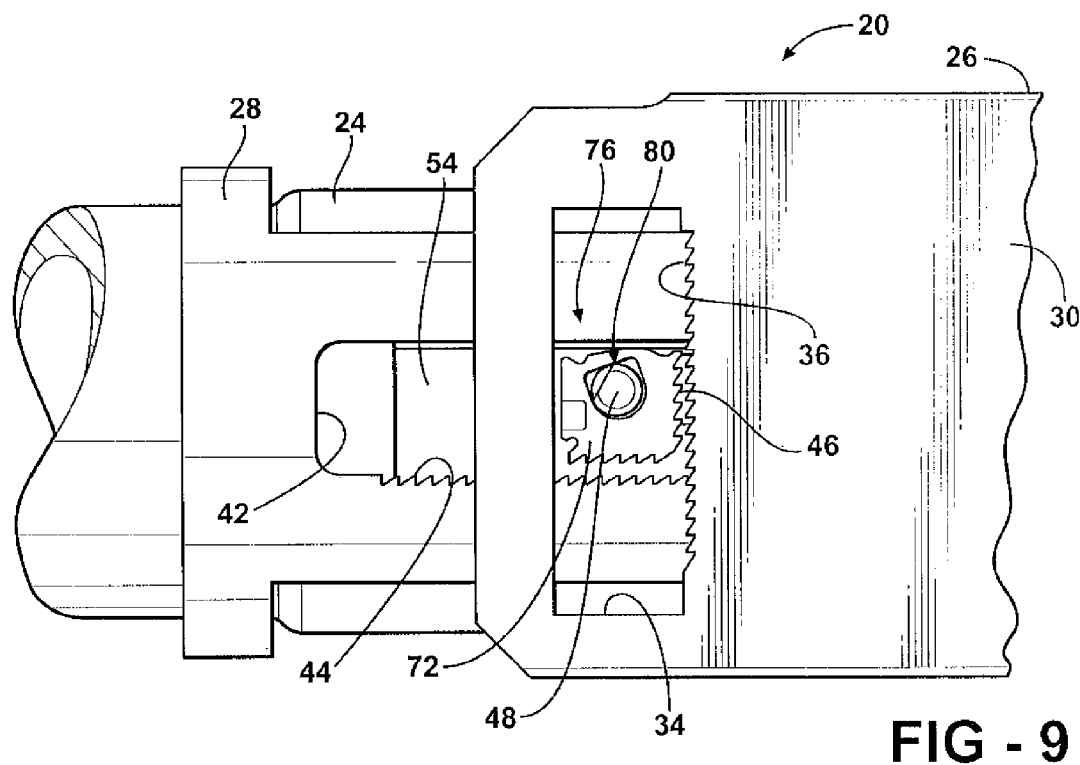
FIG. 9 is a partial side plan view of the steering column assembly in the release position.

Referring to FIGS. 8 and 9, the second transverse cam interface 80 includes the shaft 48 having the shank portion 60, with the shank portion 60 defining a cam profile. As shown, the cam profile of the shank portion 60 includes a D-shaped cross section perpendicular to the shaft axis 50. However, it should be appreciated that the cam profile on the shank portion 60 may include some other cross sectional shape perpendicular to the shaft axis 50. The second transverse cam interface 80 further includes the aperture 74 of the pawl 72. The cam profile of the shank portion 60 extends through the aperture 74 for engaging and interacting with the pawl 72.

In operation, the second transverse cam interface 80 moves the pawl 72 relative to the shaft axis 50. As the shaft 48 rotates between the lock position and the release position, the cam profile of the shank portion 60 rotates within the aperture 74. The interaction between the cam profile of the shank portion 60 and the pawl 72 moves the pawl 72 relative to the compression bracket 28. Accordingly, rotating the shaft 48 into the release position moves the pawl 72 in a generally upward vertical direction out of engagement with the telescope slot teeth 44, as shown in FIG. 9. Similarly, rotating the shaft 48 into the lock position moves the pawl 72 in a generally downward vertical direction into interlocking engagement with the telescope slot teeth 44, as shown in FIG. 8. It should be appreciated that the second transverse cam interface 80 of both the first transverse cam mechanism 76A and the second transverse cam mechanism 76B operate in the same manner on opposing halves of the column jacket 24.

Referring to FIGS. 1, 3, 4 and 6, the first transverse cam interface 78 and the second transverse cam interface 80 of both the first transverse cam mechanism 76A and the second transverse cam mechanism 76B cooperate together to move the pawl 72 generally vertically relative to the longitudinal axis 22 and into and out of interlocking engagement with the telescope slot teeth 44.

The steering column assembly 20 further comprises an axial cam mechanism 82. The axial cam mechanism 82 biases the compression bracket 28 and the mounting bracket 26 together axially along the shaft axis 50 in response to rotation of the shaft 48 into the lock position. The axial cam mechanism 82 axially releases the compression bracket 28 from the mounting bracket 26 along the shaft axis 50 in response to rotation of the shaft 48 into the release position. Accordingly, the axial cam mechanism 82 provides a compressive force to bind the compression bracket 28 and the mounting bracket 26 together. As such, the transverse cam mechanism 76 operates to provide a mechanical lock against longitudinal movement of the column jacket 24 relative to the mounting bracket 26. The axial cam mechanism 82 operates to bind the compression bracket 28 and the mounting bracket 26 together to resist both vertical adjustment and longitudinal adjustment of the column jacket 24 relative the mounting bracket 26.

The axial cam mechanism 82 includes a cam plate 84 attached to the mounting bracket 26 and a cam follower 86 mounted to the shaft 48. The cam follower 86 is rotatable with the shaft 48 between the lock position and the release position for engaging the cam plate 84. The cam follower 86 rides along the cam profile of the cam plate 84 compressing the slider body 54 and the compression bracket 28 between the head portion 58 of the shaft 48 and the mounting bracket 26 in response to rotation of the shaft 48 into the lock position. The cam follower 86 rides along the cam profile of the cam plate 84 releasing the compressive force in response to rotation of the shaft 48 into the release position.

As the first half and the second half of the steering column assembly 20 are mirror images of each other, the axial cam mechanism 82 includes a first axial cam mechanism 82A coupled to the first shaft 48A and a second axial cam mechanism 82B coupled to the second shaft 48B. The first axial cam mechanism 82A and the second axial cam mechanism 82B are disposed on opposing sides of the column jacket 24. The first axial cam mechanism 82A includes a first cam plate 84A attached to the mounting bracket 26 and a first cam follower 86A mounted to the first shaft 48A. The first cam follower 86A is rotatable with the first shaft 48A between the lock position and the release position for engaging the first cam plate 84A. The second axial cam mechanism 82B includes a second cam plate 84B attached to the mounting bracket 26 and a second cam follower 86B mounted to the second shaft 48B. The second cam follower 86B is rotatable with the second shaft 48B between the lock position and the release position for engaging the second cam plate 84B.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a mounting bracket configured for attachment to the vehicle;
   a column jacket coupled to said mounting bracket and longitudinally moveable along a longitudinal axis relative to said mounting bracket;
   a compression bracket mounted to said column jacket and defining a telescope slot having a plurality of telescope slot teeth extending along said longitudinal axis;
   a shaft coupled to said column jacket and extending along a shaft axis intersecting said column jacket and transverse to said longitudinal axis with said shaft rotatable between a lock position and a release position;
   a pawl coupled to said shaft for engagement with said telescope slot teeth; and
   a transverse cam mechanism coupled to said shaft for moving said pawl transverse to said shaft axis into interlocking engagement with said telescope slot teeth in response to rotation of said shaft into said lock position to prevent said longitudinal movement of said column jacket and out of interlocking engagement with said telescope slot teeth in response to rotation of said shaft into said release position to permit said longitudinal movement of said column jacket;
   wherein said transverse cam mechanism includes a head portion mounted on said shaft and defining a cam profile, and a block disposed between said head portion and said compression bracket and engaging said cam profile of said head portion.

2. An assembly as set forth in claim 1 wherein said transverse cam mechanism includes a first transverse cam interface for moving said shaft and said pawl relative to said longitudinal axis.

3. An assembly as set forth in claim 2 wherein said transverse cam mechanism includes a second transverse cam interface for moving said pawl relative to said shaft axis.

4. An assembly as set forth in claim 1 wherein said cam profile of said head portion includes a D-shaped cross section perpendicular to said shaft axis.

5. An assembly as set forth in claim 1 further comprising a slider body disposed between said column jacket and said compression bracket and moveable relative to said block in a generally vertical direction transverse to said shaft axis.

6. An assembly as set forth in claim 5 wherein said slider body includes a cross section perpendicular to said longitudinal axis defining a C-shaped channel facing said column jacket.

7. An assembly as set forth in claim 6 wherein said head portion is disposed within said C-shaped channel of said slider body.

8. An assembly as set forth in claim 5 further comprising a thrust washer disposed between said head portion and said slider body.

9. An assembly as set forth in claim 5 further comprising a spring disposed between said slider body and said compression bracket to bias said slider body in said generally vertical direction transverse to said shaft axis.

10. An assembly as set forth in claim 9 wherein said spring includes a bar spring.

11. An assembly as set forth in claim 9 further comprising a retainer in sliding engagement with said column jacket and rotatably supporting said head portion of said shaft.

12. An assembly as set forth in claim 11 wherein said transverse cam mechanism further includes said shaft including a shank portion defining a cam profile.

13. An assembly as set forth in claim 12 wherein said cam profile of said shank portion includes a D-shaped cross section perpendicular to said shaft axis.

14. An assembly as set forth in claim 12 wherein said transverse cam mechanism further includes said pawl defining an aperture with said cam profile of said shank portion extending through said aperture for engaging said pawl.

15. An assembly as set forth in claim 14 further comprising a lever mounted to said shaft for rotating said shaft between said lock position and said release position.

16. An assembly as set forth in claim 1 wherein said mounting bracket defines a rake slot having a plurality of rake slot teeth extending generally vertically and transverse to said longitudinal axis.

17. An assembly as set forth in claim 16 wherein said pawl includes a plurality of rake teeth for engaging said rake slot teeth in response to a collision event.

18. An assembly as set forth in claim 1 further comprising an axial cam mechanism biasing said compression bracket and said mounting bracket together axially along said shaft axis in response to rotation of said shaft into said lock position and axially releasing said compression bracket from said mounting bracket along said shaft axis in response to rotation of said shaft into said release position.

19. An assembly as set forth in claim 18 wherein said axial cam mechanism includes a cam plate attached to said mounting bracket and a cam follower mounted to said shaft and rotatable with said shaft between said lock position and said release position for engaging said cam plate.

20. A steering column assembly for a vehicle, said assembly comprising:
   a mounting bracket configured for attachment to the vehicle;

a column jacket coupled to said mounting bracket and longitudinally moveable along a longitudinal axis relative to said mounting bracket;

a compression bracket mounted to said column jacket;

a first shaft coupled to said column jacket and extending along a shaft axis intersecting said column jacket and transverse to said longitudinal axis and a second shaft coupled to said column jacket and extending along said shaft axis and disposed on an opposing side of said column jacket with said first shaft and said second shaft simultaneously rotatable between a lock position and a release position;

a first pawl coupled to said first shaft for engagement with said telescope slot teeth of said first telescope slot and a second pawl coupled to said second shaft for engagement with said telescope slot teeth of said second telescope slot;

a first transverse cam mechanism coupled to said first shaft for moving said first pawl transverse to said shaft axis in response to rotation of said first shaft, said first transverse cam mechanism including a first head portion mounted on said first shaft and defining a first cam profile, and a first block disposed between said first head portion and said compression bracket and engaging said first cam profile;

a second transverse cam mechanism coupled to said second shaft for moving said second pawl transverse to said shaft axis in response to rotation of said second shaft, said second transverse cam mechanism including a second head portion mounted on said second shaft and defining a second cam profile, and a second block disposed between said second head portion and said compression bracket and engaging said second cam profile; and a lever attached to said first shaft and said second shaft for simultaneously rotating said first shaft and said second shaft between said lock position and said release position to simultaneously operate said first transverse cam and said second transverse cam.

21. An assembly as set forth in claim 20 wherein said compression bracket defines a first telescope slot and a second telescope slot each having a plurality of telescope slot teeth extending along said longitudinal axis wherein said first transverse cam mechanism moves said first pawl transverse to said shaft axis into interlocking engagement with said telescope slot teeth of said first telescope slot in response to rotation of said first shaft into said lock position to prevent said longitudinal movement of said column jacket and out of interlocking engagement with said telescope slot teeth of said first telescope slot in response to rotation of said first shaft into said release position to permit said longitudinal movement of said column jacket and wherein said second transverse cam mechanism moves said second pawl transverse to said shaft axis into interlocking engagement with said telescope slot teeth of said second telescope slot in response to rotation of said second shaft into said lock position to prevent said longitudinal movement of said column jacket and out of interlocking engagement with said telescope slot teeth of said second telescope slot in response to rotation of said second shaft into said release position to permit said longitudinal movement of said column jacket.

22. An assembly as set forth in claim 20 further comprising a first axial cam mechanism coupled to said first shaft and a second axial cam mechanism coupled to said second shaft for biasing said compression bracket and said mounting bracket together axially along said shaft axis in response to rotation of said first shaft and said second shaft into said lock position and axially releasing said compression bracket from said mounting bracket along said shaft axis in response to rotation of said first shaft and said second shaft into said release position.

23. An assembly as set forth in claim 22 wherein said first axial cam mechanism includes a first cam plate attached to said mounting bracket and a first cam follower mounted to said first shaft and rotatable with said first shaft between said lock position and said release position for engaging said first cam plate and wherein said second axial cam mechanism includes a second cam plate attached to said mounting bracket and a second cam follower mounted to said second shaft and rotatable with said second shaft between said lock position and said release position for engaging said second cam plate.

* * * * *